US009069678B2

(12) United States Patent
Benhase et al.

(10) Patent No.: US 9,069,678 B2
(45) Date of Patent: *Jun. 30, 2015

(54) ADAPTIVE RECORD CACHING FOR SOLID STATE DISKS

(75) Inventors: Michael T. Benhase, Tucson, AZ (US); Lokesh M. Gupta, Tucson, AZ (US); Joseph S. Hyde, II, Tucson, AZ (US); Lee C. LaFrese, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 792 days.

This patent is subject to a terminal disclaimer.

(21) Appl. No.: 13/190,833

(22) Filed: Jul. 26, 2011

(65) Prior Publication Data
US 2013/0031297 A1 Jan. 31, 2013

(51) Int. Cl.
*G06F 12/08* (2006.01)

(52) U.S. Cl.
CPC ........ *G06F 12/0868* (2013.01); *G06F 12/0888* (2013.01)

(58) Field of Classification Search
CPC ............ G06F 12/0866; G06F 12/0868; G06F 12/0888; G06F 3/061
USPC .................................. 711/103, 113, 136, 160
See application file for complete search history.

(56) References Cited

U.S. PATENT DOCUMENTS

| | | | |
|---|---|---|---|
| 4,536,836 A | 8/1985 | Dodd et al. | |
| 5,615,353 A | 3/1997 | Lautzenheiser | |
| 6,098,153 A * | 8/2000 | Fuld et al. | 711/134 |
| 7,707,382 B2 | 4/2010 | Gill et al. | |
| 7,899,987 B2 | 3/2011 | Salomon et al. | |
| 2006/0080510 A1 | 4/2006 | Benhase et al. | |
| 2009/0182933 A1 | 7/2009 | Jang et al. | |
| 2010/0088459 A1* | 4/2010 | Arya et al. | 711/103 |
| 2010/0199036 A1 | 8/2010 | Siewert et al. | |
| 2010/0211731 A1* | 8/2010 | Mittendorff et al. | 711/113 |
| 2010/0281208 A1 | 11/2010 | Yang | |
| 2010/0318734 A1 | 12/2010 | Vaid et al. | |
| 2010/0318744 A1 | 12/2010 | Benhase et al. | |
| 2011/0035548 A1 | 2/2011 | Kimmel et al. | |

FOREIGN PATENT DOCUMENTS

| | | |
|---|---|---|
| CN | 101488354 | 7/2009 |
| EP | 0109309 | 5/1984 |

OTHER PUBLICATIONS

Hsu, H. and Y. Bai, "Using Nand Flash Memory to Improve the Performance of HDDS", 2010 23rd Canadian Conference on Electrical and Computer Engineering (CCECE), May 2010, 6 pp.

(Continued)

*Primary Examiner* — Michael Alsip
(74) *Attorney, Agent, or Firm* — Rabindranath Dutta; Konrad Raynes Davda & Victor LLP

(57) ABSTRACT

A storage controller receives a request that corresponds to an access of a track. A determination is made as to whether the track corresponds to data stored in a solid state disk. Record staging to a cache from the solid state disk is performed, in response to determining that the track corresponds to data stored in the solid state disk, wherein each track is comprised of a plurality of records.

21 Claims, 10 Drawing Sheets

(56) References Cited

OTHER PUBLICATIONS

IBM Corporation, "Optimized Solid State Drive Utilization in a System with Heterogenous Solid State and Mechanical Disks", Technical Disclosure, IP.com No. IPCOM000183404D, May 21, 2009, 8 pp.

IBM Corporation, "SSD Spares for Read Caching", Technical Disclosure, IP.com No. IPCOM000192665D, Jan. 28, 2010, 3 pp.

Liu, Y., J. Huang, C. Xie, and Q. Cao, "RAF: A Random Access First Cache Management to Improve SSD-based Disk Cache", 2010 Fifth IEEE International Conference on Networking, Architecture, and Storage, Jul. 2010, 9 pp.

PCT International Search Report and Written Opinion dated Nov. 8, 2012 for Application No. PCT/CN2012/077504 filed Jun. 26, 2012, pp. 1-12.

Information Materials for references cited in CN counterpart Nov. 28, 2012, pp. 1-4.

U.S. Appl. No. 13/452,527, filed Apr. 20, 2012, entitled "Adaptive Record Caching for Solid State Disks", invented by M.T. Benhase et al., 35 pp. [18.398C1 (Appln)].

Preliminary Amendment for U.S. Appl. No. 13/452,527, filed Apr. 20, 2012, 18 pp. [18.398C1 (PrelimAmend)].

Office Action dated Aug. 9, 2014, pp. 22, for U.S. Appl. No. 13/452,527, filed Apr. 20, 2014 (18.398C1).

Response dated Nov. 19, 2014, pp. 9, to Office Action dated Aug. 19, 2014, pp. 22, for U.S. Appl. No. 13/452,527, filed Apr. 20, 2014 (18.398C1).

* cited by examiner

ADAPTIVE RECORD CACHING FOR SOLID STATE DISKS

BACKGROUND

1. Field

The disclosure relates to a method, system, and article of manufacture for adaptive record caching for solid state disks.

2. Background

A storage controller may control a plurality of storage devices that may include hard disks, tapes, etc. A cache may also be maintained by the storage controller, where the cache may comprise a high speed storage that is accessible more quickly in comparison to certain other storage devices, such as, hard disks, tapes, etc. However, the total amount of storage capacity of the cache may be relatively smaller in comparison to the storage capacity of certain other storage devices, such as, hard disks, etc., that are controlled by the storage controller.

In certain storage controllers, various anticipatory or adaptive caching mechanisms may be used to store data in the cache. Certain data that is more frequently used or data that is likely to be used more frequently may be moved to cache in anticipation that the data is likely to be accessed in the near future. Such types of caching mechanisms may be referred to as anticipatory or adaptive caching and may be performed by an adaptive caching application maintained in a storage controller. In response to a request for data, if the requested data is not found in the cache, the storage controller may retrieve the requested data from the storage devices that are controlled by the storage controller.

A solid state disk (SSD) may comprise a storage device that uses solid state memory to store persistent digital data. Solid state disks may include flash memory or memory of other types. Solid state disks may be accessed much faster in comparison to electromechanically accessed data storage devices, such as, hard disks.

SUMMARY OF THE PREFERRED EMBODIMENTS

Provided are a method, a system, and a computer program product in which a storage controller receives a request that corresponds to an access of a track. A determination is made as to whether the track corresponds to data stored in a solid state disk. Record staging to a cache from the solid state disk is performed, in response to determining that the track corresponds to data stored in the solid state disk, wherein each track is comprised of a plurality of records.

In further embodiments, a determination is made as to whether the track corresponds to data stored in a hard disk. A selection is made among performing partial track staging, full track staging and record staging to the cache from the hard disk, based on a criterion maintained by the storage controller, in response to determining that the track corresponds to data stored in the hard disk. In full track staging an entire track is staged, in partial track staging all sectors starting from the start of requested sectors to the end of the track are staged, and in record staging only the requested sectors are staged.

In yet further embodiments, the record staging from the solid state disk is performed when the track has not been accessed relatively recently, and a selection is made at least among performing partial track staging and performing full track staging when the track has been accessed relatively recently.

In additional embodiments, a least recently used list is maintained for tracks, wherein each track in the list is numbered sequentially in a monotonically increasing order as each track is accessed in the cache and then placed in the least recently used list. A determination is made as to whether a selected track has been used recently based on a predetermined criterion that is based on sequence numbers of tracks in the least recently used list for tracks, an amount of cache space consumed by those tracks that are stored in the cache, and a threshold value that indicates an amount of storage.

In yet additional embodiments, the record staging is used as a default staging operation for solid state disks that are coupled to the storage controller, and partial track staging is used as the default staging operation for hard disks that are coupled to the storage controller, wherein in the partial track staging all sectors starting from the start of requested sectors to the end of the track are staged, and in the record staging only the requested sectors are staged.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Adaptive Caching Mechanisms

Adaptive caching mechanisms may be designed for hard disks that are coupled to a storage controller. In certain embodiments, solid state devices may also be coupled to a storage controller. However, solid state disks have different characteristics than hard disks. While solid state disks may be accessed much faster in comparison to hard disks, the performance of solid state disks may be much worse with large block transfers than with small block transfers. However, adaptive caching mechanisms that are designed for hard disks may perform large block transfers. In certain embodiments in which solid state disks are used, such adaptive caching mechanisms may be modified for improving the performance of solid state disks.

In certain embodiments, record caching is preferred for solid state disks in comparison to partial track caching that is preferred for hard disks. Record caching (i.e., the staging or the copying of records/sectors that are requested to the cache) causes relatively small block transfers in comparison to partial track caching or for that matter full track caching. It should be noted that a track is comprised of a plurality of records and transferring an entire track or a partial track typically causes large block transfer in comparison to transferring selected records.

Additionally, in certain embodiments, if a track of a solid state disk has not been used recently [i.e., the track is low in a Least Recently Used (LRU) list maintained for the cache] then record caching is used. In certain embodiments, when a track of a solid state disk has been used recently (i.e., the track is high in the LRU list maintained for the cache) staging operations from the solid state disk to the cache may be performed in a similar matter to staging operations from a hard disk to the cache, by choosing among record staging, partial track staging, or full track staging.

Therefore, in certain embodiments, adaptive caching applications for hard disks are modified to generate an augmented adaptive caching application that may be used for both hard disks and solid state devices.

Exemplary Embodiments

Figure 1:
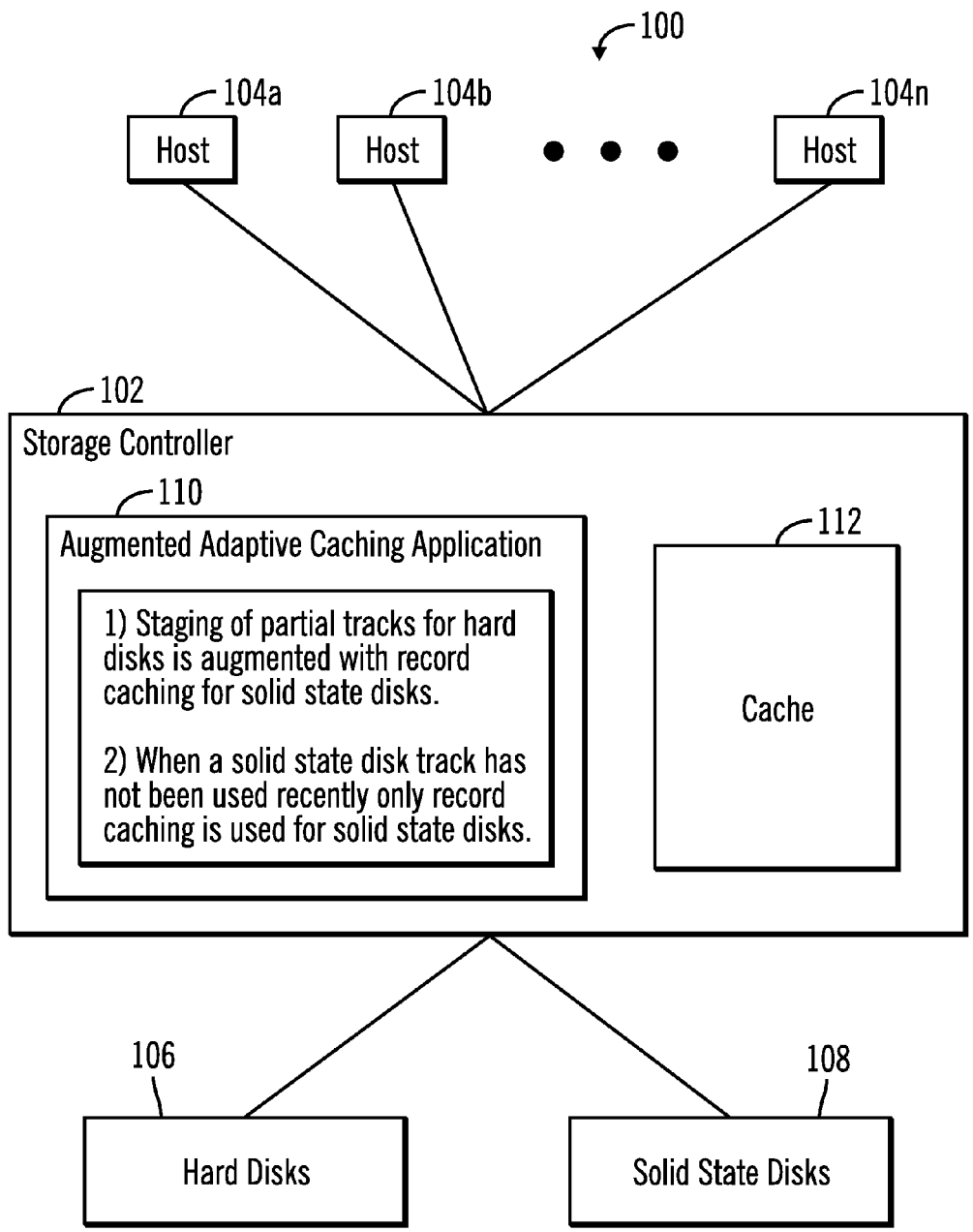
FIG. 1 illustrates a block diagram of a computing environment that includes a storage controller coupled to a plurality of hosts, a plurality of hard disks, and a plurality of solid state disks, in accordance with certain embodiments.

FIG. 1 illustrates a block diagram of a computing environment 100 that includes a storage controller 102 coupled to a plurality of hosts 104a, 104b, . . . 104n, a plurality of hard disks 106, and a plurality of solid state disks 108, in accordance with certain embodiments.

The storage controller 102 and the hosts 104a . . . 104n may comprise any suitable computational device including those presently known in the art, such as, a personal computer, a workstation, a server, a mainframe, a hand held computer, a palm top computer, a telephony device, a network appliance, a blade computer, a server, etc. The plurality of hard disks 106 may comprise any suitable physical hard disks known in the art. The plurality of solid state disks 108 may comprise any suitable physical solid state disks known in the art.

The storage controller 102, the hosts 104a . . . 104n, the plurality of hard disks 106, and the plurality of solid state disks 108 may communicate over a network, such as the Internet, a storage area network, a wide area network, a local area network, etc. The plurality of hard disks 106 may be configured within one or more hard disk drives, and the plurality of solid state disks 108 may be configured within one or more solid state disk drives.

The storage controller 102 executes an augmented adaptive caching application 110 and controls a cache 112 that is shown within the storage controller 102. In alternative embodiments, the cache 112 may be present outside the storage controller 102.

The augmented adaptive caching application 110 augments the staging of partial tracks for hard disks 106 with record caching for solid state disks 108. In certain embodiments, when a solid state disk track has not been used recently, only record caching is used for solid state disks. The application 110 is referred to as an augmented adaptive caching application 110 because adaptive caching applications that are designed for hard disks may be modified or augmented with additional operations to create the augmented adaptive caching application 110, such that both solid state disks and hard disks can operate efficiently under the control of the storage controller 102.

Figure 2:
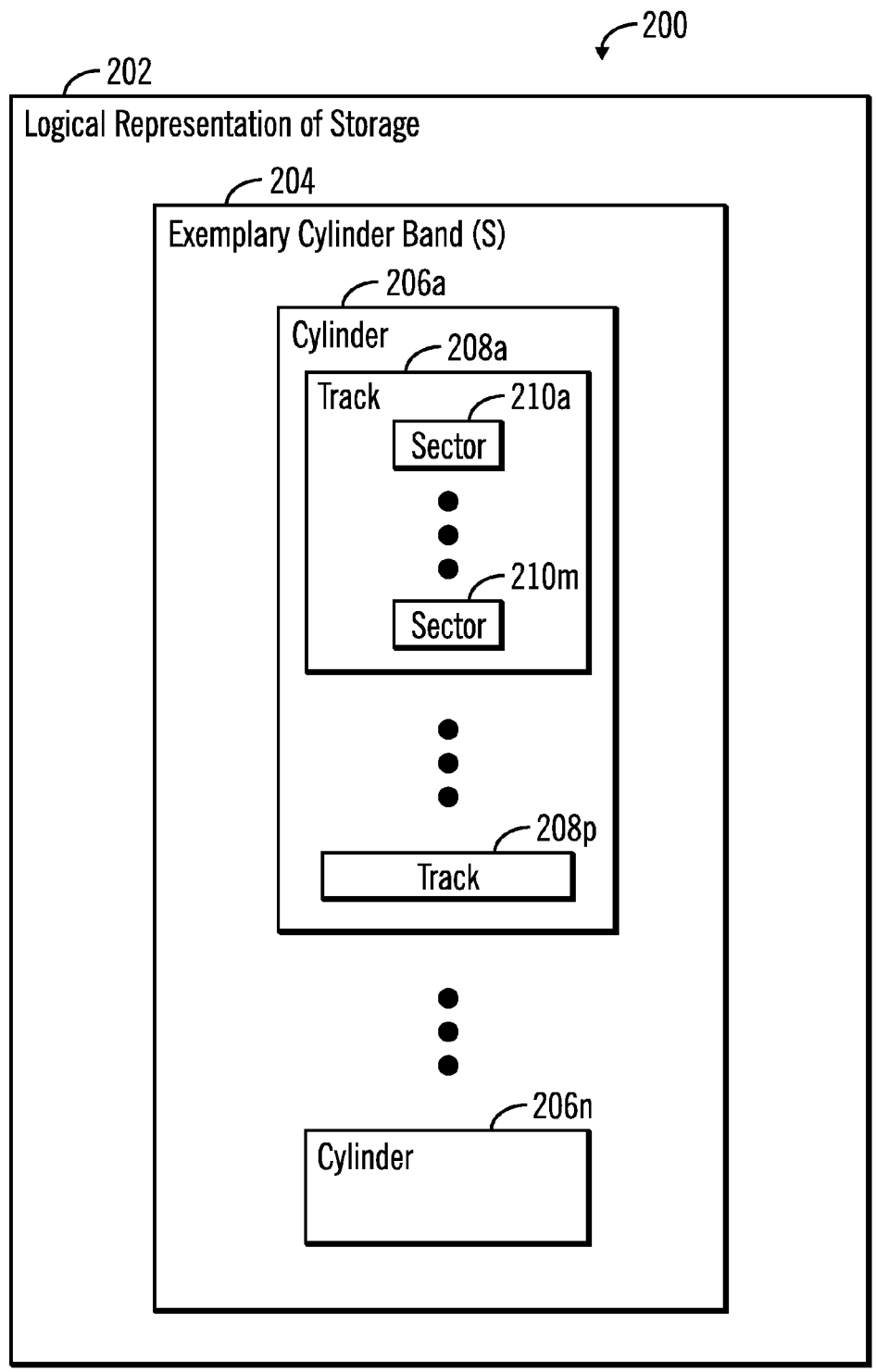
FIG. 2 illustrates a block diagram that shows the logical representation of storage, in accordance with certain embodiments.

FIG. 2 illustrates a block diagram 200 that shows the logical representation of storage 202, in accordance with certain embodiments.

The augmented adaptive caching application 110 may dynamically change the staging operations used for data. The granularity for the adaptation is a cylinder band 204 which is an arbitrary number of consecutive cylinders 206a . . . 206n on a device. In certain embodiments, the number of cylinders in a band may be 126. Each band of cylinders may contain data structures to manage the adaptive caching statistics associated with that band.

Each cylinder may include a plurality of tracks, where each track may include a plurality of sectors. For example, cylinder 206a is shown having a plurality of tracks 208a . . . 208p, where track 208a is comprised of a plurality of sectors 210a . . . 210m. A sector is a specifically sized division of a hard disk drive, solid state disk, or any other type of storage medium. An operating system may refer to records that correspond to sectors stored on a storage medium.

Figure 3A:
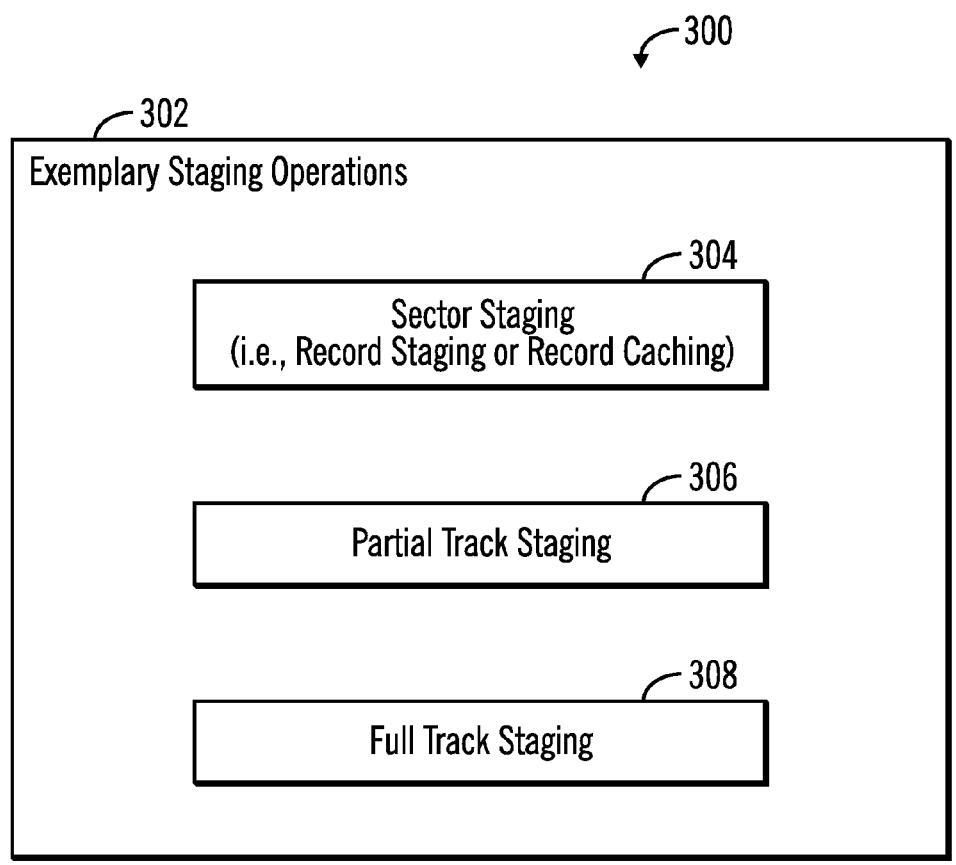
FIG. 3a illustrates a block diagram that shows exemplary staging operations, in accordance with certain embodiments.

FIG. 3 illustrates a block diagram 300 that shows exemplary staging operations 302, in accordance with certain embodiments. A staging operation may copy data from a hard disk or some other storage medium to the cache 112. The following three staging strategies are supported by the augmented adaptive caching application 110:

(a) Sector staging (also referred to as record staging or record caching) 304: In sector staging only sector(s) required to satisfy a current request are staged to the cache 112;

(b) Partial track staging 306: In partial track staging, a partial track is staged from the initial point of access on the track, to the end of the track; and (c) Full Track staging 308: In full track staging, irrespective of the access point on the track, the entire track staged into the cache 112.

Figure 3B:
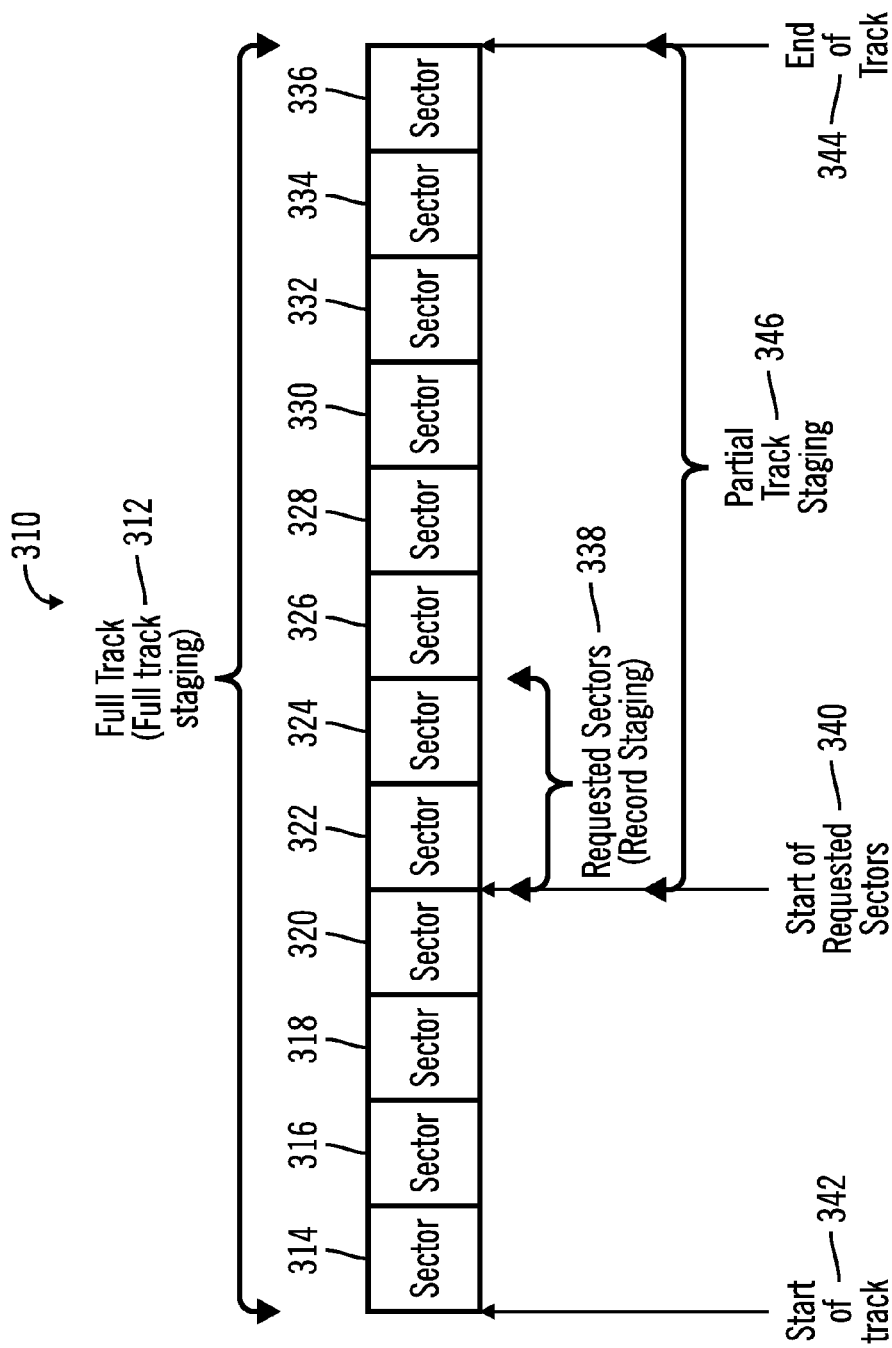
FIG. 3b illustrates a block diagram that shows full track staging, partial track staging, and record staging, in accordance with certain embodiments.

FIG. 3b illustrates a block diagram 310 that shows full track staging, partial track staging, and record staging, in accordance with certain embodiments. In FIG. 3b a full track 312 that is comprised of a plurality of sectors 314, 316, 318, 320, 322, 324, 326, 328, 330, 332, 334, 336 are shown. A host, such as host 104a, requests the storage controller 102 for the sectors shown as requested sectors 338, where the start of the requested sectors is indicated via reference numeral 340 in FIG. 3b. The start of track 342 and the end of track 344 for the full track 312 are also shown. Full track staging is the staging of the full track 312 to the cache 112. Partial track staging 346 is the staging of sectors from the start of the requested sectors 340 to the end of the track 344, to the cache 112. Record staging is the staging of the requested sectors 338 to the cache 112.

Figure 4:
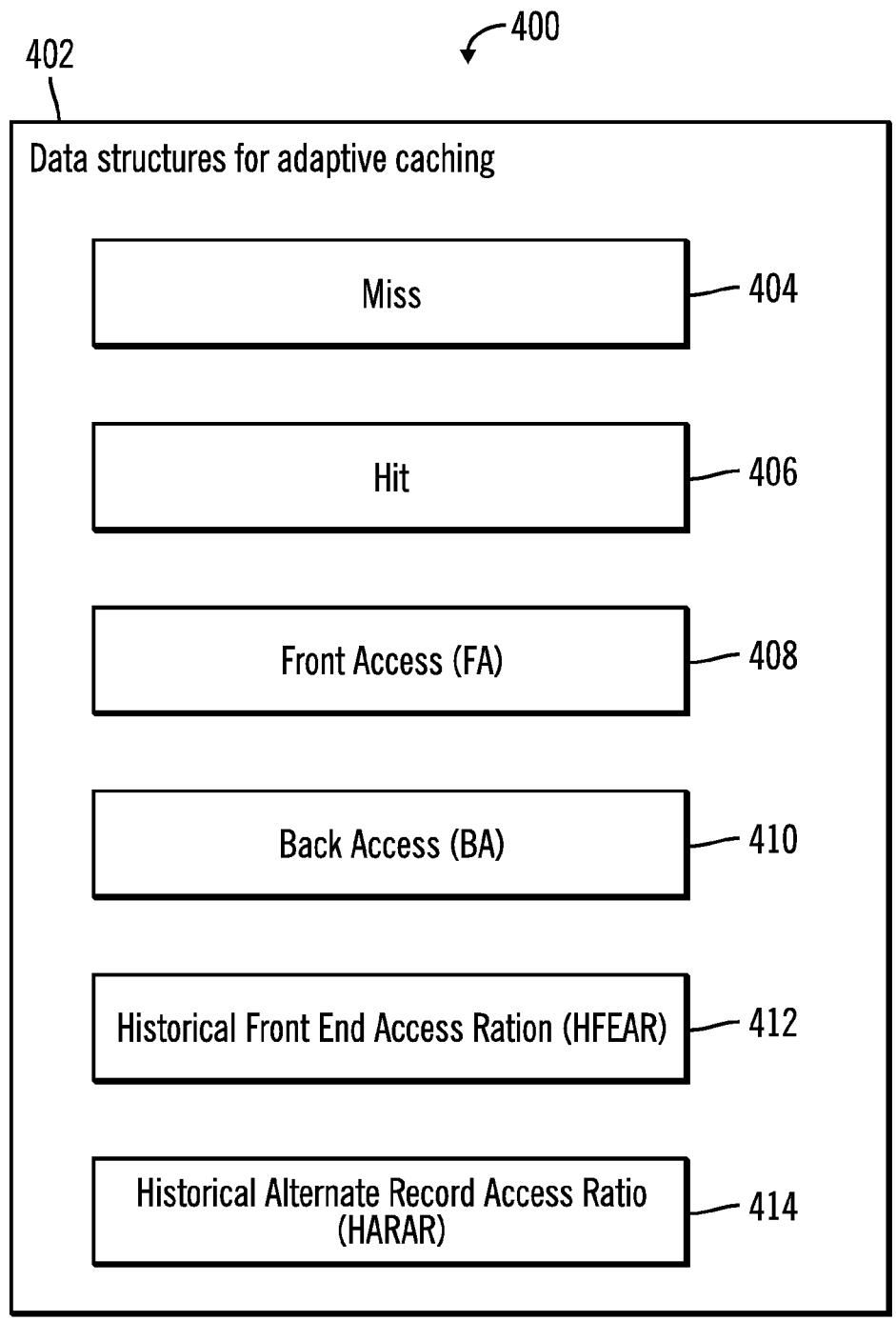
FIG. 4 illustrates a block diagram that shows data structures for adaptive caching, in accordance with certain embodiments.

FIG. 4 illustrates a block diagram 400 that shows data structures 402 for adaptive caching, in accordance with certain embodiments. In adaptive caching, in order to determine which staging strategy to use for a particular request the following counters are maintained via the data structures 402 for each cylinder band:

1) Miss 404: Incremented if the track is not in cache 112;
2) Hit 406: Incremented if the track is in cache 112;
3) Front Access (FA) 408: Incremented if the track is in cache and the first sector requested precedes the sector that caused the track to be promoted;

4) Back Access (BA) 410: Incremented if the track is in cache and the first sector requested follows the sector that caused the track to be promoted;

5) Historical front end access ratio (HFEAR) 412; and

6) Historical alternate record access ratio (HARAR) 414.

These counters are updated for each access to a track. After approximately every 128 accesses to a cylinder band the historical ratios are updated and the current staging strategy for the cylinder band is updated.

Figure 5:
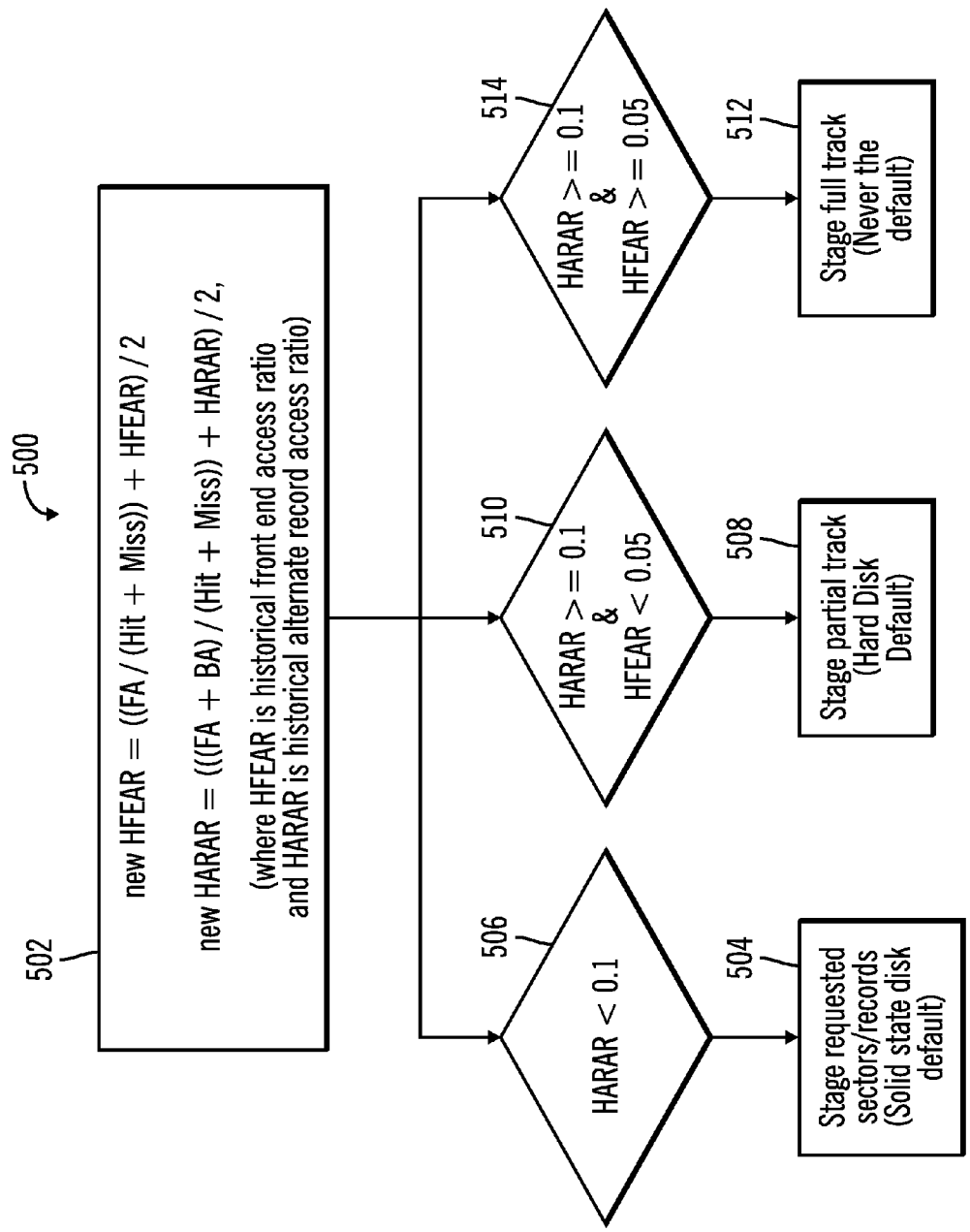
FIG. 5 illustrates a block diagram that shows operations for adaptive caching, in accordance with certain embodiments.

FIG. 5 illustrates a block diagram that shows operations 500 for adaptive caching, in accordance with certain embodiments. In FIG. 5, the following historical ratios are calculated (reference numeral 502) as follows:

new HFEAR=((FA/(Hit+Miss))+HFEAR)/2 new HARAR=(((FA+BA)/(Hit+Miss))+HARAR)/2

The cylinder band staging strategy is to set to stage requested sectors 504 only if HARAR is less than 0.10 (reference numeral 506), to stage a partial track 508 if HARAR is greater than or equal to 0.10 and HFEAR is less than 0.05, (reference numeral 510), and to stage a full track (reference numeral 512) if HARAR is greater than or equal to 0.10 and HFEAR is greater than or equal to 0.05 (reference numeral 514).

In certain embodiments the adaptive caching operations shown in FIG. 5 may be applied to hard disks. Staging of sector, partial tracks or a full track may be performed in accordance with the computations and conditions shown in FIG. 5. In alternative embodiments, other calculations and conditions may be used to implement adaptive caching operations. In certain embodiments that may implement variations of the adaptive caching operations shown in FIG. 5 for solid state disks and/or hard disks, the operations of staging requested sectors/records shown in block 504 may be used as a default operation for solid state disks, the operations of staging partial track shown in block 508 may be used as a default operation for hard disks, and the operations of staging a full track shown in block 508 is never used as a default operation.

Figure 6:
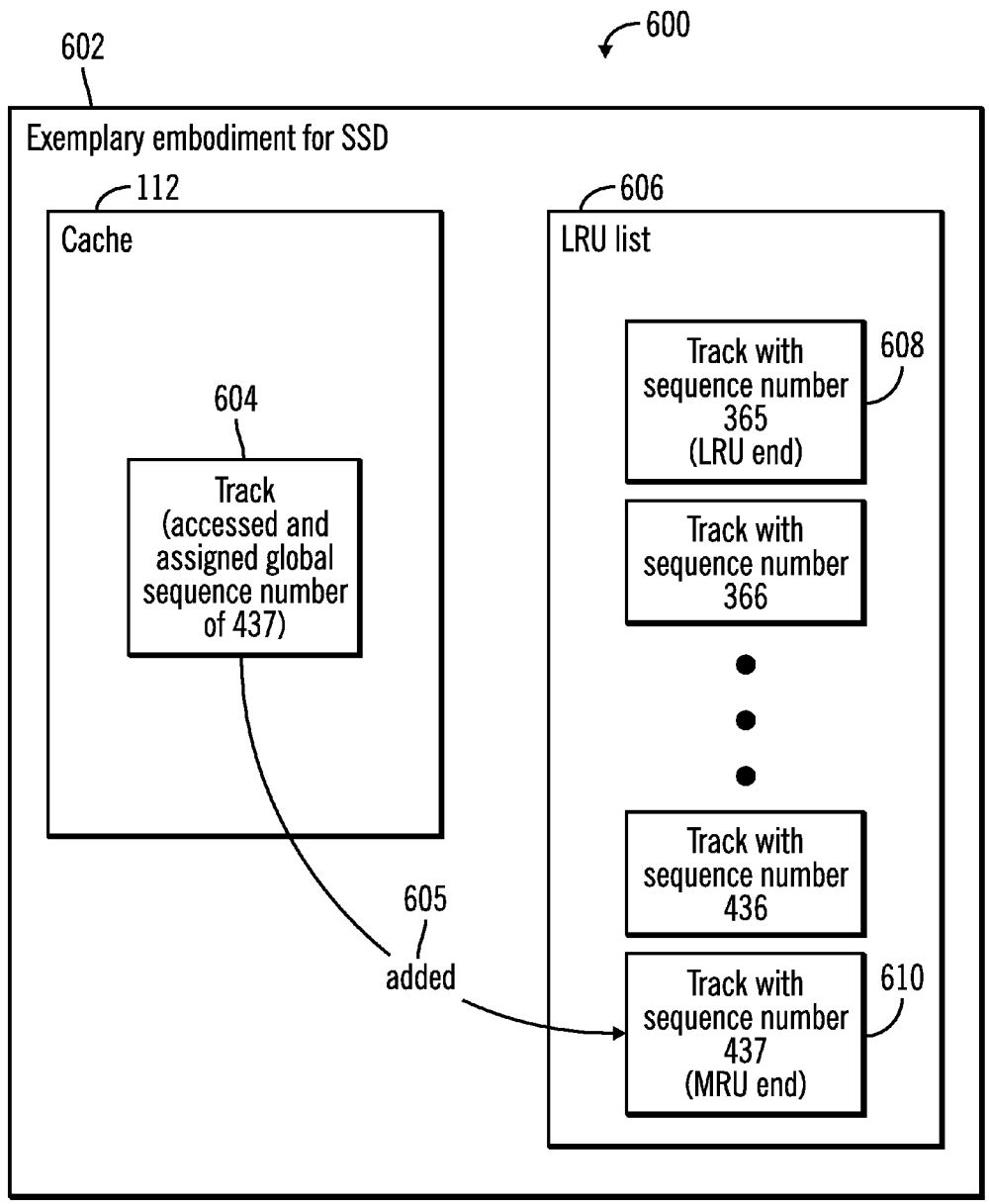
FIG. 6 illustrates a block diagram that shows an exemplary embodiment for solid state disks, in accordance with certain embodiments.

FIG. 6 illustrates a block diagram 600 that shows an exemplary embodiment 602 for solid state disks 108, in accordance with certain embodiments.

Every track in cache 112 has a global sequence number, where the global sequence number is a monotonically increasing number. When an exemplary track 604 is accessed in the cache 112, the track 604 is assigned this global sequence number and is added 605 to the most recently used end of a Least Recently Used (LRU) list 606. The global sequence number is then incremented. Therefore, all tracks in the LRU list 606 have assigned sequence numbers, such that a track 608 at the least recently used end has the lowest sequence number and a track 610 at the most recently used end has the highest sequence number.

Figure 7:
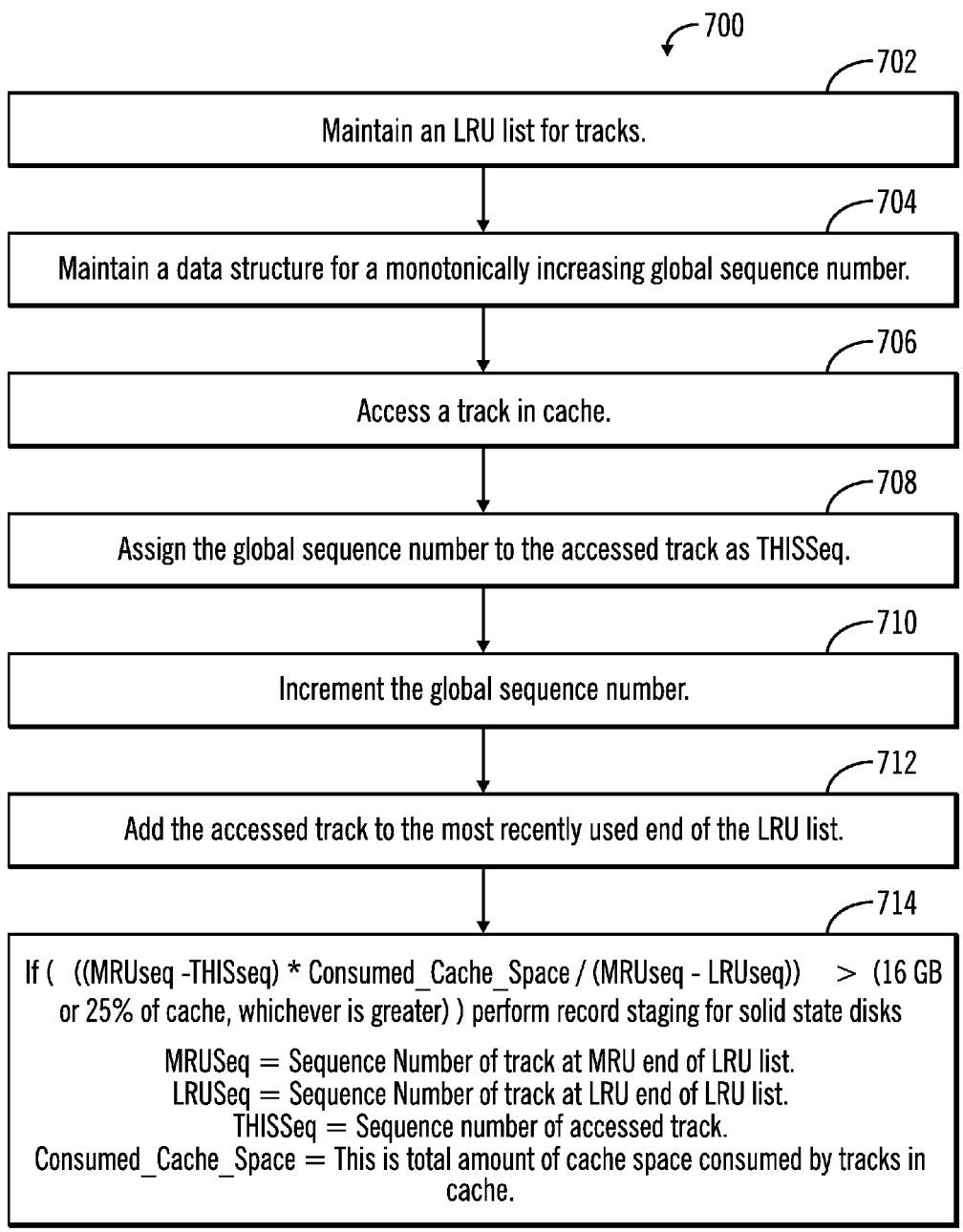
FIG. 7 illustrates a flowchart that shows certain operations, in accordance with certain embodiments.

FIG. 7 illustrates a flowchart 700 that shows certain operations, in accordance with certain embodiments. The operations shown in FIG. 7 correspond to operations performed by the augmented adaptive caching application 110 which may be generated by modifying the adaptive caching applications used for adaptive caching in hard disks as shown in FIGS. 3a, 3b, 4, and 5.

Control starts at block 702 where an LRU list 606 is maintained for tracks. A data structure for a monotonically increasing global sequence number is maintained (at block 704). A track is accessed in cache (at block 706), and the global sequence number is assigned to the accessed track as the variable "THISSeq" (at block 708) and then the global sequence number is incremented (at block 710). The accessed track is added (at block 712) to the most recently used end of the LRU list 606.

Control proceeds to block 714 in which for solid state disk tracks if the position of the track is low in the LRU list 606 (i.e. this access to the track is independent from the previous access) record caching is performed. In other words, record caching is used for solid state device tracks at the low end of LRU list 606. Partial track staging/caching remains the default for hard disks. Determination of low position is performed as follows: If (((MRUseq−THISseq)*Consumed_Cache_Space/(MRUseq−LRUseq))>16 GB or 25% of cache, whichever is greater) then perform record caching, where:

MRUSeq=Sequence Number of track at MRU end of LRU list;

LRUSeq=Sequence Number of track at LRU end of LRU list;

THISSeq=Sequence number of this track; and

Consumed_Cache_Space=This is total amount of cache space consumed by tracks in cache.

Therefore, in FIG. 7, staging of records is used for solid state disks when an access is independent of previous accesses, i.e., a track that is being accessed has not been accessed recently. In such situations, it is preferable to perform small block transfers by staging sectors/records rather than staging a full or partial track to the cache.

Figure 8:
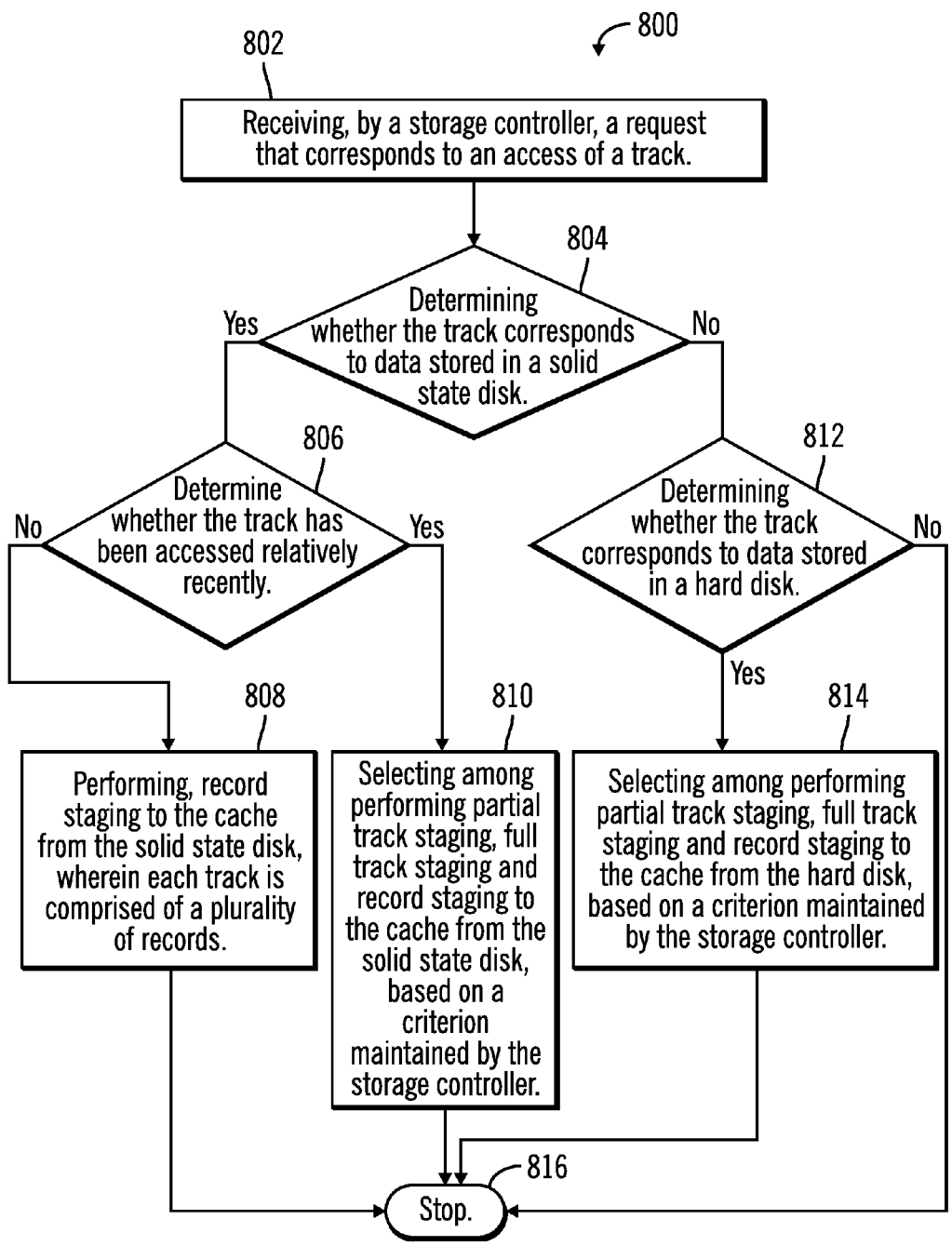
FIG. 8 illustrates a flowchart that shows certain operations, in accordance with certain embodiments.

FIG. 8 illustrates a flowchart 800 that shows certain operations, in accordance with certain embodiments. In certain embodiments, the operations shown in FIG. 8 may be performed by the augmented adaptive caching application 110 that is implemented in the storage controller 102.

Control starts at block 802 in which a storage controller 102 receives a request that corresponds to an access of a track. The request may be received by the storage controller 102 from one of the hosts 104a . . . 104n. The request may be for one or more records (corresponding to sectors) that reside in a track.

Control proceeds to block 804, in which the augmented adaptive caching application 110 in the storage controller 102 determines whether the track corresponds to data stored in a solid state disk 108. If so, the augmented adaptive caching application 110 determines (at block 806) whether the track has been accessed relatively recently. The determination as to whether the track has been accessed relatively recently may be made in accordance with the operations shown in block 714 of FIG. 7 in which it is determined whether the track has a low sequence number (in which case the has not been accessed relatively recently) or a high sequence number (in which case the track has been accessed relatively recently).

If at block 806 it is determined that the track has not been accessed relatively recently, control proceeds to block 808 in which the augmented adaptive caching application 110 performs record staging to the cache 112 from the solid state disk 108. It may be noted that each track is comprised of a plurality of records. In solid state disks it is more efficient to transfer fewer blocks of data at a time. As a result, unless there is an overwhelming likelihood that adjacent records that are not requested are likely to be used in the near future, it is preferable to perform record staging to the cache 112 for solid state disks. Therefore, when a track has not been accessed recently (i.e., the track is towards the least recently used end in the LRU list 606) it is preferable to perform only record caching (i.e., staging of requested sectors/records only) for solid state disks.

If at block 806 it is determined that the track has been accessed relatively recently (i.e., the track is towards the most recently used end in the LRU list 606) then control proceeds to block 810 in which the augmented adaptive caching application 110 selects among performing partial track staging, full track staging and record staging to the cache 112 from the solid state disk 108, based on a criterion maintained by the storage controller 102. In certain embodiments, the criterion to select whether to perform partial track staging, full track staging or record staging may be based on the operations shown in FIG. 5, blocks 504, 506, 508, 510, 512, 514 that show when to stage requested sectors/records 504, when to stage a partial track 508 and when to stage a full track 512. Therefore, the augmented adaptive caching application 110 functions in a similar manner for solid state disks and hard disks when a track is towards the most recently used end in the LRU list 606 in the cache 112.

If at block 804, it is determined that the track does not correspond to data stored in a solid state disk, control proceeds to block 812 where a determination is made as to whether the track corresponds to data stored in a hard disk 106. If so, the augmented adaptive caching application 110 selects (at block 814) among performing partial track staging, full track staging and record staging to the cache 112 from the hard disk 106, based on a criterion maintained by the storage controller 102. In certain embodiments, the criterion to select whether to perform partial track staging, full track staging or record staging may be based on the operations shown in FIG. 5 that show when to stage requested sectors/records 504, when to stage a partial track 508 and when to stage a full track 512.

If at block 812, a determination is made that the track does not correspond to data stored in a hard disk 106, then the process stops (at block 816). Control also proceeds from blocks 808, 810, and 814 to block 816 where the process stops.

Therefore, FIGS. 1-8 illustrate certain embodiments in which staging of partial tracks for hard disks is augmented with record caching for solid state disks, wherein when a solid state disk track not been used recently only record caching is used for solid state disks. In may be noted that in full track staging an entire track is staged, in partial track staging all sectors starting from the start of requested sectors to the end of the track are staged, and in record staging only the requested sectors are staged. Certain embodiments provide conditions under which partial track staging, record staging, and/or full track staging are performed by a storage controller that controls both hard disks and solid state disks.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
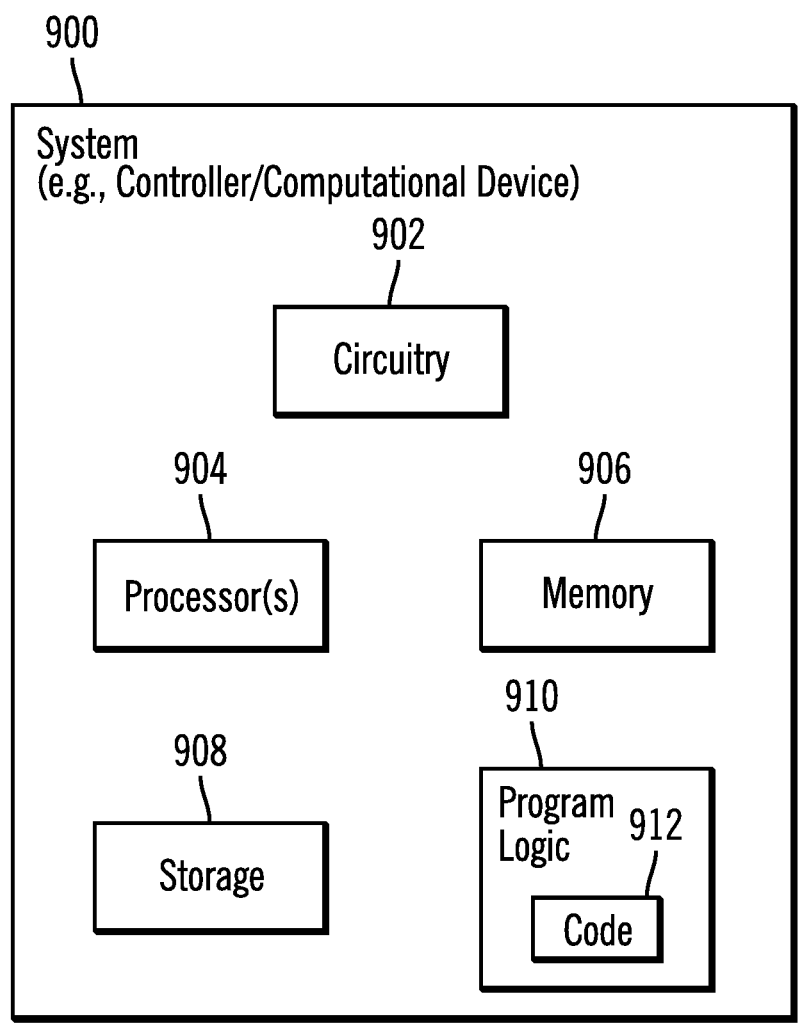
FIG. 9 illustrates a block diagram of a computational system that shows certain elements that may be included in the storage controller of FIG. 1, in accordance with certain embodiments.

FIG. 9 illustrates a block diagram that shows certain elements that may be included in the storage controller 102 or the hosts 104a . . . 104n, in accordance with certain embodiments. The system 900 may comprise the storage controller 102 or the hosts 104a . . . 104n, and may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system, comprising:
a memory; and
a processor coupled to the memory, wherein the processor performs operations, the operations comprising:
receiving a request that corresponds to an access of a track;
determining whether the track corresponds to data stored in a solid state disk; and
performing, record staging to a cache from the solid state disk, in response to determining that the track corresponds to data stored in the solid state disk, wherein each track is comprised of a plurality of records, and wherein:
the record staging to the cache from the solid state disk is performed in response to determining that a historical alternate record access ratio is less than a first predetermined value, wherein the record staging is a default staging mechanism for the solid state disk; and
partial track staging is performed in response to determining that the historical alternate record access ratio is greater than the first predetermined value and a historical front end access ratio is less than a second predetermined value, wherein the partial track staging is the default staging mechanism for hard disks.

2. The system of claim 1, wherein in full track staging an entire track is staged, in partial track staging all sectors starting from the start of requested sectors to the end of the track are staged, and in record staging only the requested sectors are staged.

3. The system of claim 1, wherein the record staging from the solid state disk is performed when the track has not been accessed relatively recently, and selecting at least among performing partial track staging and performing full track staging when the track has been accessed relatively recently.

4. The system of claim 1, the operations further comprising:
maintaining a least recently used list for tracks, wherein each track in the list is numbered sequentially in a monotonically increasing order as each track is accessed in the cache and then placed in the least recently used list; and
determining whether a selected track has been used recently based on a predetermined criterion that is based on sequence numbers of tracks in the least recently used list for tracks, an amount of cache space consumed by those tracks that are stored in the cache, and a threshold value that indicates an amount of storage.

5. The system of claim 1, wherein:
the record staging is used as a default staging operation for solid state disks; and
partial track staging is used as the default staging operation for hard disks, wherein in the partial track staging all sectors starting from the start of requested sectors to the end of the track are staged, and in the record staging only the requested sectors are staged.

6. A storage controller in communication with a solid state disk and a hard disk, the storage controller comprising:
a processor;
a cache coupled to the processor, wherein the storage controller performs:
receiving a request that corresponds to an access of a track;
determining whether the track corresponds to data stored in the solid state disk; and
performing, record staging to the cache from the solid state disk, in response to determining that the track corresponds to data stored in the solid state disk, wherein each track is comprised of a plurality of records, and wherein:
the record staging to the cache from the solid state disk is performed in response to determining that a historical alternate record access ratio is less than a first predetermined value, wherein the record staging is a default staging mechanism for the solid state disk; and
partial track staging is performed in response to determining that the historical alternate record access ratio is greater than the first predetermined value and a historical front end access ratio is less than a second predetermined value, wherein the partial track staging is the default staging mechanism for hard disks.

7. The storage controller of claim 6, wherein in full track staging an entire track is staged, in partial track staging all sectors starting from the start of requested sectors to the end of the track are staged, and in record staging only the requested sectors are staged.

8. The storage controller of claim 6, wherein the record staging from the solid state disk is performed when the track has not been accessed relatively recently, and selecting at least among performing partial track staging and performing full track staging when the track has been accessed relatively recently.

9. The storage controller of claim 6, wherein the storage controller further performs:
maintaining a least recently used list for tracks, wherein each track in the list is numbered sequentially in a monotonically increasing order as each track is accessed in the cache and then placed in the least recently used list; and
determining whether a selected track has been used recently based on a predetermined criterion that is based on sequence numbers of tracks in the least recently used list for tracks, an amount of cache space consumed by those tracks that are stored in the cache, and a threshold value that indicates an amount of storage.

10. The storage controller of claim 6, wherein:
the record staging is used as a default staging operation for solid state disks that are coupled to the storage controller; and
partial track staging is used as the default staging operation for hard disks that are coupled to the storage controller, wherein in the partial track staging all sectors starting from the start of requested sectors to the end of the track are staged, and in the record staging only the requested sectors are staged.

11. A computer program product, the computer program product comprising:
a computer readable storage medium having computer readable program code embodied therewith, the computer readable program code configured to perform operations, the operations comprising:
receiving, by a storage controller, a request that corresponds to an access of a track;
determining whether the track corresponds to data stored in a solid state disk; and
performing, record staging to a cache from the solid state disk, in response to determining that the track corresponds to data stored in the solid state disk, wherein each track is comprised of a plurality of records, and wherein:
the record staging to the cache from the solid state disk is performed in response to determining that a historical alternate record access ratio is less than a first predetermined value, wherein the record staging is a default staging mechanism for the solid state disk; and
partial track staging is performed in response to determining that the historical alternate record access ratio is greater than the first predetermined value and a historical front end access ratio is less than a second predetermined value, wherein the partial track staging is the default staging mechanism for hard disks.

12. The computer program product of claim 11, wherein in full track staging an entire track is staged, in partial track staging all sectors starting from the start of requested sectors to the end of the track are staged, and in record staging only the requested sectors are staged.

13. The computer program product of claim 11, wherein the record staging from the solid state disk is performed when the track has not been accessed relatively recently, and selecting at least among performing partial track staging and performing full track staging when the track has been accessed relatively recently.

14. The computer program product of claim 11, the operations further comprising:
maintaining a least recently used list for tracks, wherein each track in the list is numbered sequentially in a monotonically increasing order as each track is accessed in the cache and then placed in the least recently used list; and
determining whether a selected track has been used recently based on a predetermined criterion that is based on sequence numbers of tracks in the least recently used list for tracks, an amount of cache space consumed by those tracks that are stored in the cache, and a threshold value that indicates an amount of storage.

15. The computer program product of claim 11, wherein:
the record staging is used as a default staging operation for solid state disks that are coupled to the storage controller; and
partial track staging is used as the default staging operation for hard disks that are coupled to the storage controller, wherein in the partial track staging all sectors starting from the start of requested sectors to the end of the track are staged, and in the record staging only the requested sectors are staged.

16. The system of claim 1, wherein full track staging is performed when the historical alternate record access ratio is greater than the first predetermined value and the historical front end access ratio is greater than the second predetermined value, and wherein the full track staging is not the default staging mechanism.

17. The system of claim 1, wherein the first predetermined value is greater than the second predetermined value.

18. The storage controller of claim 6, wherein full track staging is performed when the historical alternate record access ratio is greater than the first predetermined value and the historical front end access ratio is greater than the second predetermined value, and wherein the full track staging is not the default staging mechanism.

19. The storage controller of claim 6, wherein the first predetermined value is greater than the second predetermined value.

20. The computer program product of claim 11, wherein full track staging is performed when the historical alternate record access ratio is greater than the first predetermined value and the historical front end access ratio is greater than the second predetermined value, and wherein the full track staging is not the default staging mechanism.

21. The computer program product of claim 11, wherein the first predetermined value is greater than the second predetermined value.

* * * * *